United States Patent [19]

Anderson

[11] Patent Number: 4,856,894
[45] Date of Patent: Aug. 15, 1989

[54] DISTANCE MEASURING METHOD AND MEANS

[75] Inventor: Nigel I. Anderson, Transvaal, South Africa

[73] Assignee: Afgen (Proprietary) Limited, South Africa

[21] Appl. No.: 46,425

[22] Filed: May 4, 1987

[30] Foreign Application Priority Data

May 5, 1986 [ZA] South Africa ..................... 86/3335
Jun. 2, 1986 [ZA] South Africa ..................... 86/4089
Jan. 14, 1987 [ZA] South Africa ..................... 87/0231

[51] Int. Cl.$^4$ .............................................. G01C 3/24
[52] U.S. Cl. ................................................... 356/15
[58] Field of Search ..................... 356/1, 4, 15, 9, 10, 356/11

[56] References Cited

U.S. PATENT DOCUMENTS

| | | | |
|---|---|---|---|
| 160,823 | 3/1875 | Harrsch ................................ | 356/15 |
| 588,093 | 8/1897 | Searle et al. ......................... | 356/15 |
| 2,377,987 | 6/1945 | Whitmore ............................ | 356/15 |
| 2,547,232 | 4/1951 | Schwartz et al. ..................... | 356/1 |
| 3,002,093 | 9/1961 | Kis et al. ............................. | 356/1 |
| 3,049,963 | 8/1962 | Parsons ................................ | 356/11 |
| 3,302,293 | 2/1967 | French ................................. | 356/11 |
| 3,895,870 | 7/1975 | Cullen et al. ........................ | 356/4 |

FOREIGN PATENT DOCUMENTS

| | | | |
|---|---|---|---|
| 8220792 | 6/1983 | France ................................. | 356/1 |
| 871558 | 8/1987 | South Africa . | |
| 2187570 | 9/1987 | United Kingdom .................. | 356/1 |

Primary Examiner—Richard A. Rosenberger
Attorney, Agent, or Firm—Ladas & Parry

[57] ABSTRACT

In the method, relatively inclined beams of light are projected towards the target from spaced locations at the station from which the distance to the target is to be measured. The locations are moved relative to one another along a linear path to bring the illuminated zones on the object together. The spacing of the locations then gives an indication of the distance sought to be measured. Apparatus for carrying out the method is also described.

18 Claims, 5 Drawing Sheets

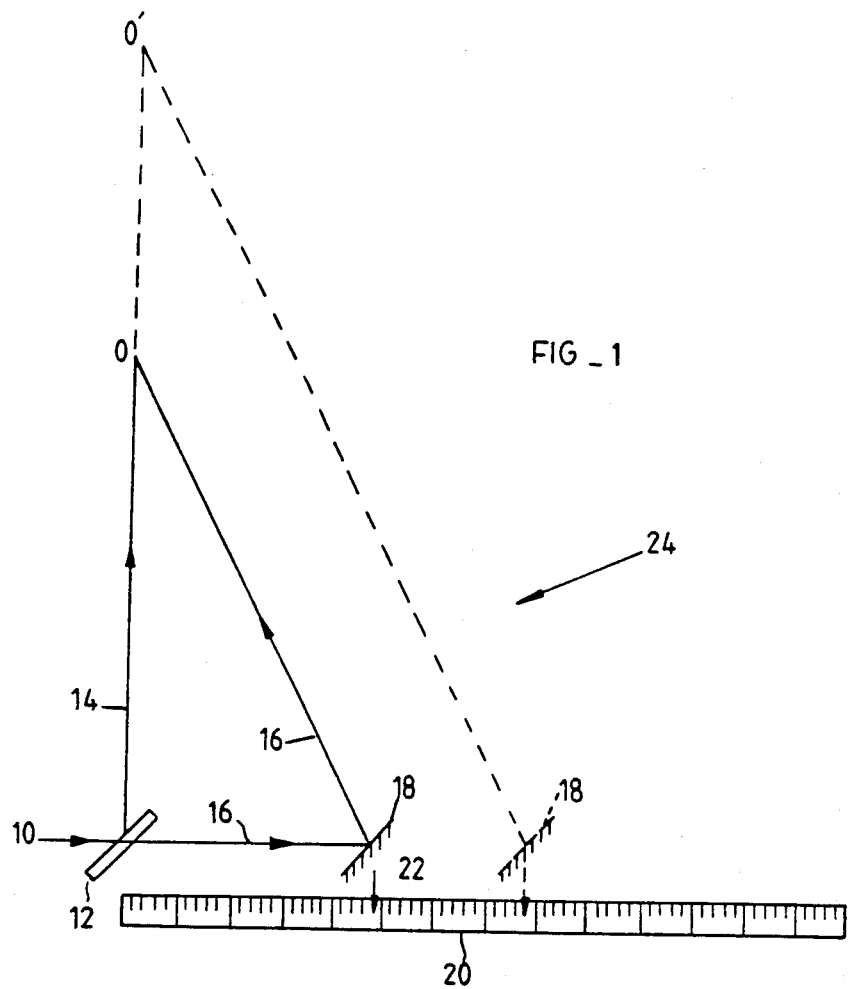
FIG _ 1

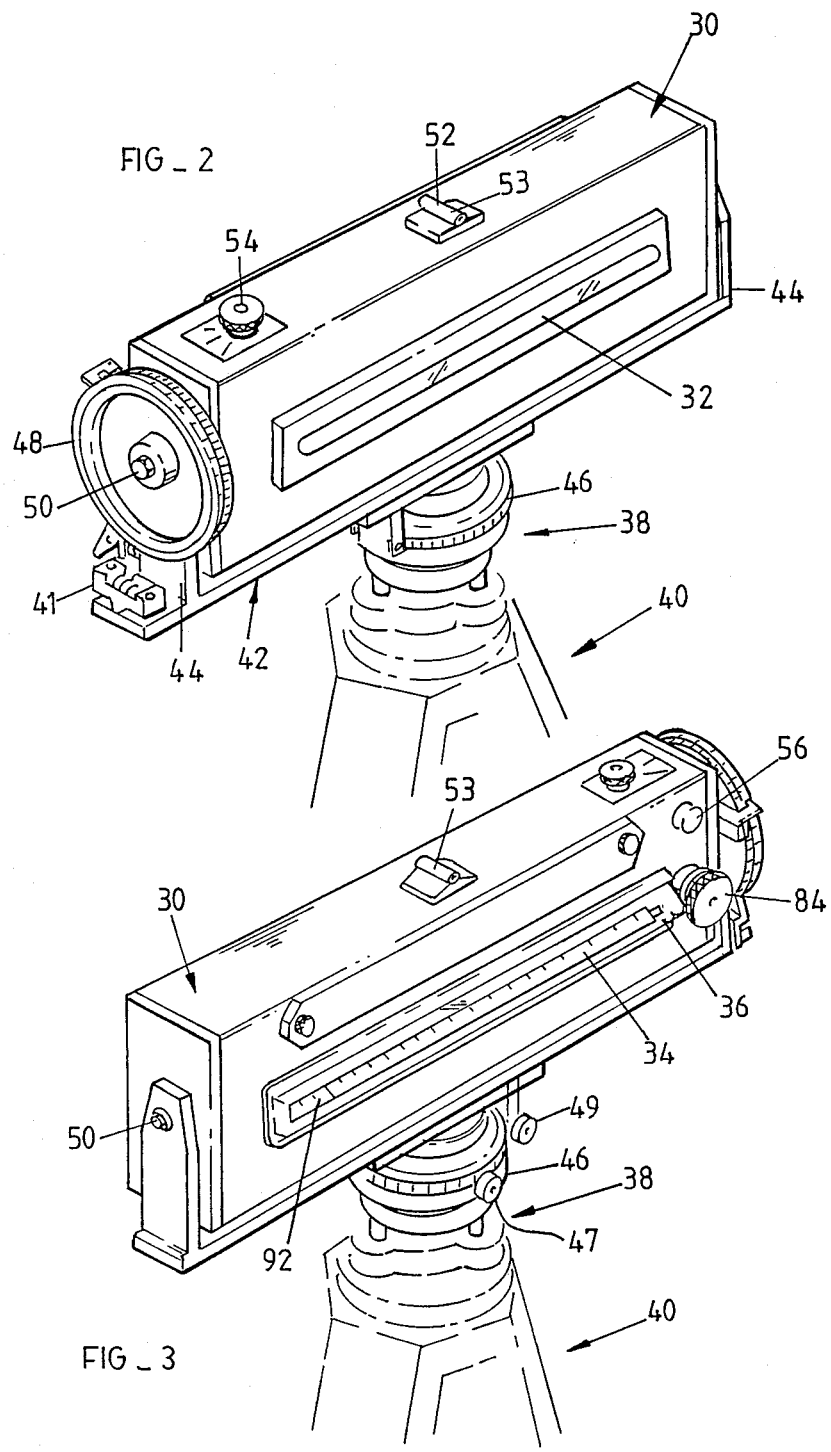

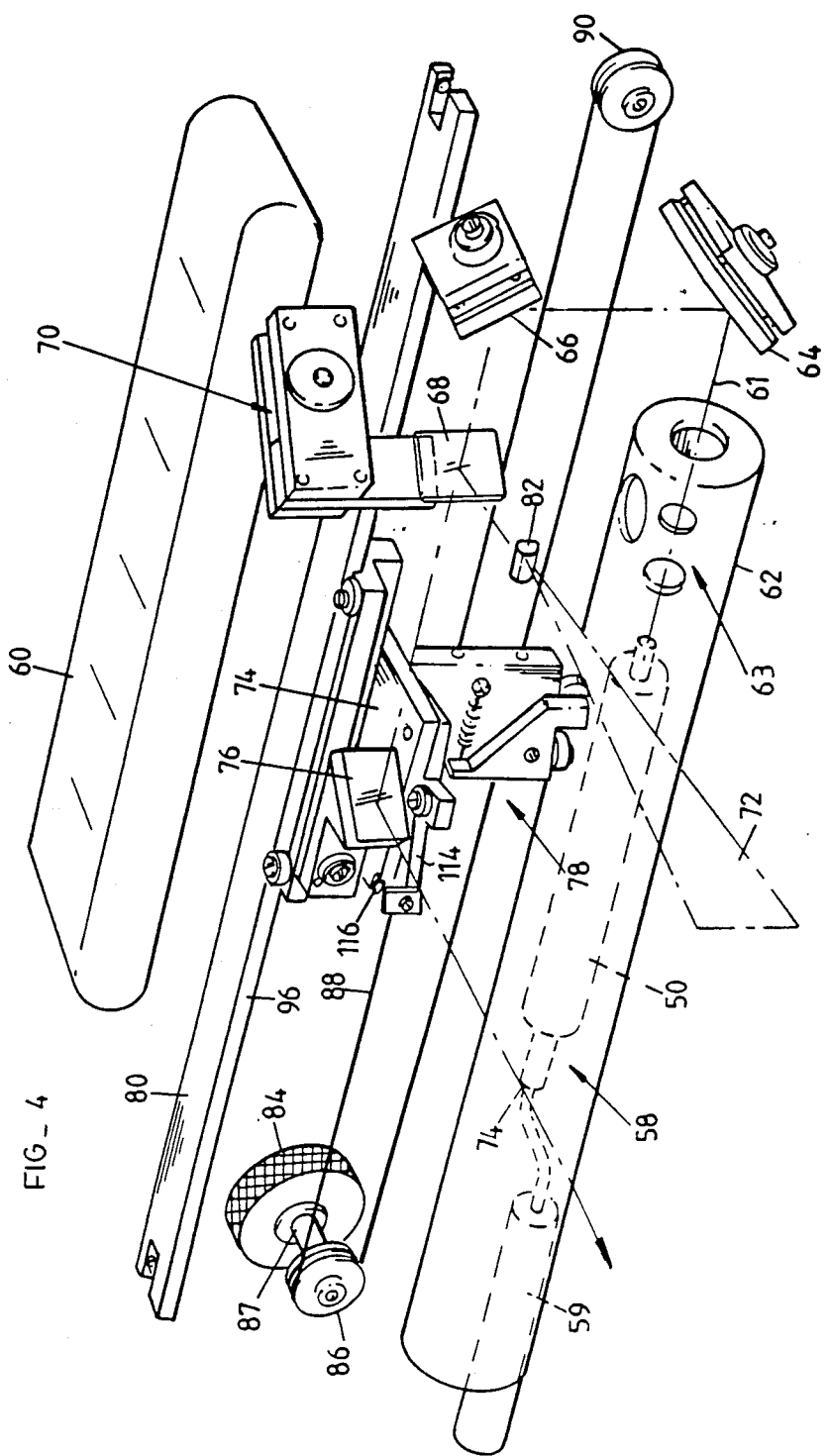
FIG_4

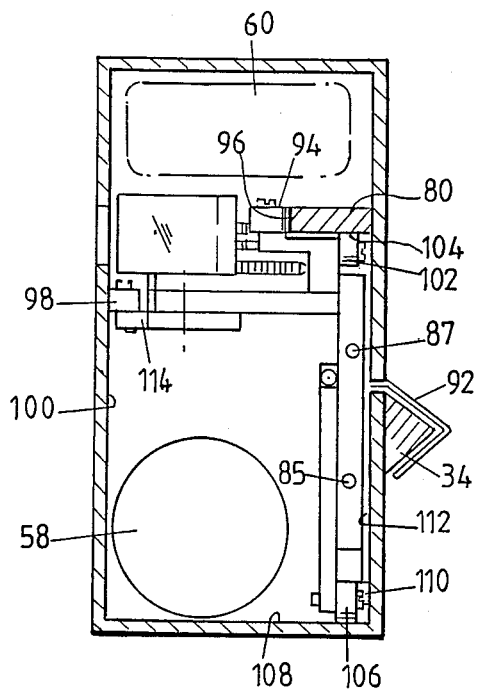
FIG_5
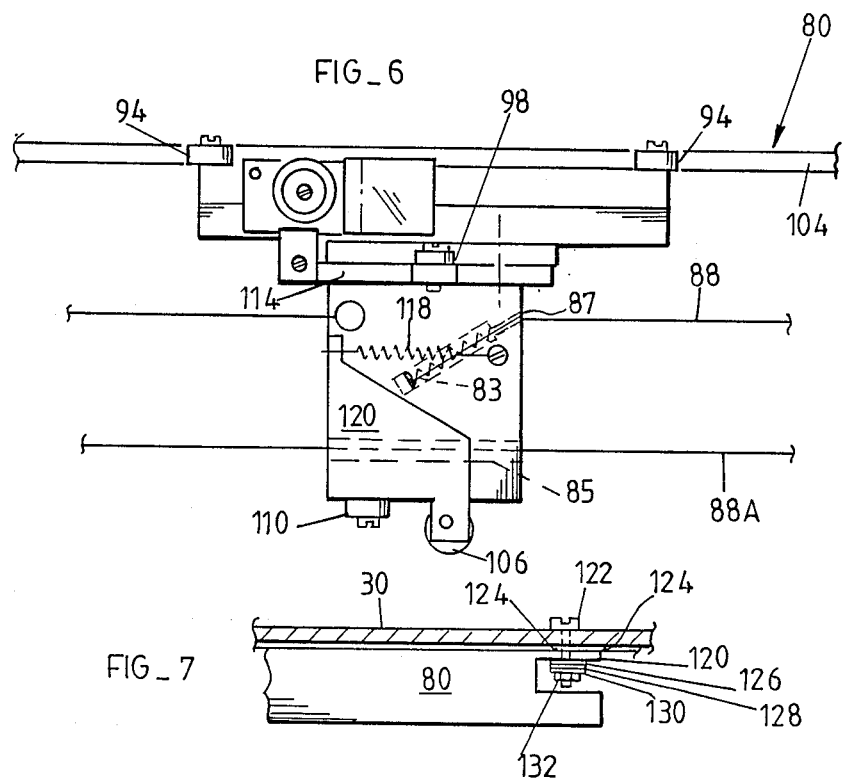
FIG_6
FIG_7

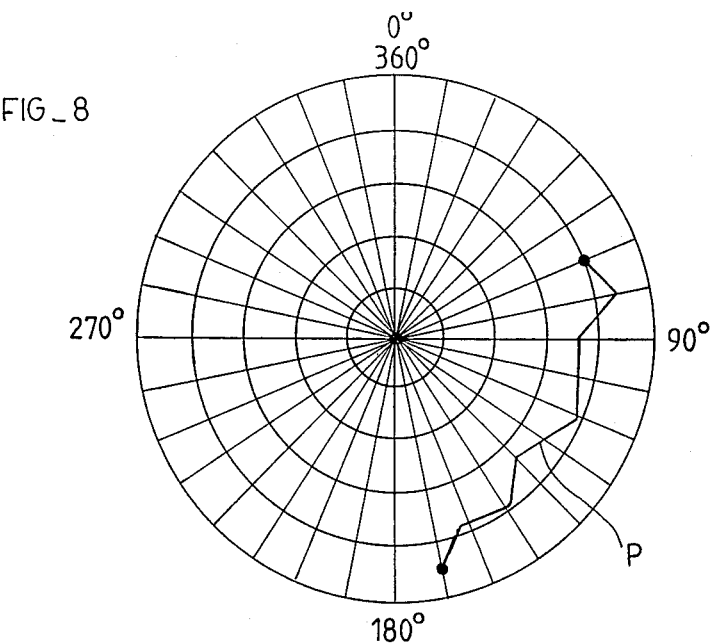
FIG_8
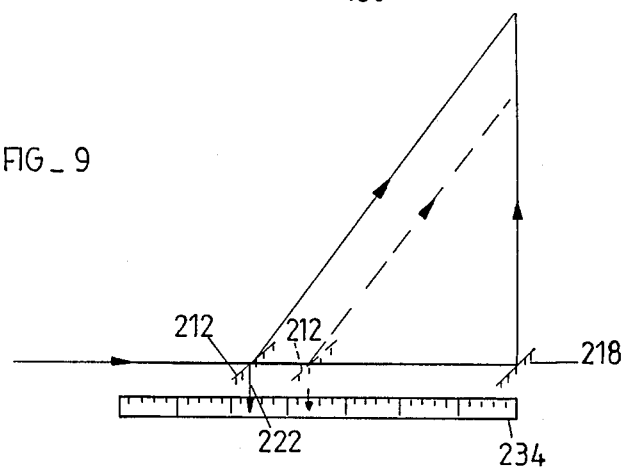
FIG_9
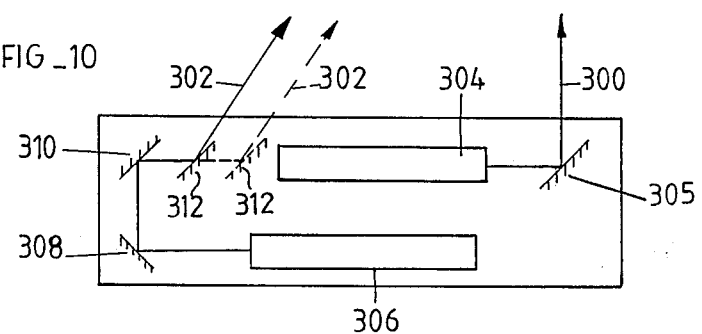
FIG_10

DISTANCE MEASURING METHOD AND MEANS

BACKGROUND OF THE INVENTION

This invention relates to a distance measuring method and means.

Requirements exist in certain spheres of activity for means whereby distances from a given point to one or more other point may be ascertained rapidly and at least reasonably accurately, without the necessity of using a measuring tape or similar means requiring physical connection between those point.

Various means already exist for achieving these requirements. For instance, the well-known optical range finder operates on the principle of aligning two mirror images of the object to which the distance is to be measured, the distance then being read off a scale on the instrument, determined by the relative positions of the mirrors.

Another means for achieving these requirements is the Electronic Distance Meter, or EDM, which operates on the principle of transmitting a modulated beam (usually infra-red) which is reflected back to the instrument from a reflector positioned at the point to which the distance is to be measured. A computer system built into the instrument calculates the distance by comparing the return signal with that originally transmitted. The distance so calculated is displayed as a readout on the display unit of the instrument.

Yet another means for achieving these requirements is by means of an impulse type EDM. This type operates on the principle of transmitting a very brief impulse, and the distance is determined by measuring the time elapsed from when the impulse signal is transmitted until the return signal is received.

The distance is then displayed on the display unit of the instrument. Certain variations of the impulse type EDM, have the advantage of being able to detect the return signal from the object to which the distance is to be measured without the use of a reflector.

All of the foregoing types of distance measuring instruments do, however, have disadvantages for use in certain applications, for example under the dark and restricted conditions pertaining in underground mines. For instance, the optical range finder is often impossible to use in dark conditions. The modulated beam type EDM requires a reflector positioned at the point to be measured, and both the modulated beam and the impulse type EDM have to be very precisely aligned onto the point where distance is to be measured, an extremely difficult and time consuming operation in, for example, underground mining conditions.

SUMMARY OF THE INVENTION

A first aspect of the invention provides a method of determining the distance of an object from a station, the method including the following steps:

(a) projecting relatively inclined beams of light from spaced locations at the station towards the object so as to illuminate first and second zones on the object;

(b) while maintaining the relative inclination between the beams of light, moving the locations relative to one another along a linear path so as to bring the first and second illuminated zones into coincidence with one another; and (c) deriving the distance of the object from the station from the spacing along the linear path between the locations when the first and second zones are coincident with one another.

A second aspect of the invention provides an apparatus for determining the distance of an object from a station, the apparatus including:

(a) means at the station for projecting relatively inclined beams of light towards the object so as to illuminate first and second zones on the object;

(b) means at the station for moving the locations relative to one another along a linear path so as to bring the first and second zones into coincidence with one another; and (c) means enabling the distance of the object from the station to be derived from the spacing of the locations along the linear path when the zones are coincident.

Preferably, the apparatus includes a graduated linear scale extending along the linear path, the distance being read off the scale. Preferably also, the beams of light are beams of coherent laser light which may be produced from a single source using, for example, a beam splitter.

BRIEF DESCRIPTION OF THE DRAWINGS

FIG. 1 diagrammatically illustrates the principles underlying the invention;

FIGS. 2 and 3 show different perspective views of an apparatus according to the invention;

FIG. 4 shows a perspective view of the interior components of the invention, the casing being omitted for clarity;

FIG. 5 shows a transverse cross-section through the casing of the apparatus;

FIG. 6 shows a detail of the movable carriage;

FIG. 7 shows a detail at one end of the guide rail;

FIG. 8 illustrates how a stope measurement plot can be obtained;

FIG. 9 illustrates schematically a second embodiment of the invention; and

FIG. 10 illustrates schematically a third embodiment of the invention.

DESCRIPTION OF THE PREFERRED EMBODIMENTS

The principles of the invention are illustrated diagrammatically in FIG. 1 which shows a collimated beam of coherent laser light 10 impinging on an inclined beam splitting plate 12. The beam splitting plate 12 splits the single incident beam 10 into two beams 14 and 16, the beam 14 being reflected by the beam splitting plate and the beam 16 passing through the plate for subsequent reflection from an inclined mirror 18 mounted on a movable carriage. A calibrated scale is indicated at 20, the carriage carrying a pointer 22 which moves over the scale when the carriage is moved towards or away from the beam splitting plate along the linear path taken by the beam 16.

The letter O indicates an object whose distance from a station at which the apparatus indicated generally at 24 is to be measured is situated. The beams 14 and 16 will each illuminate a zone on the object, the illuminated zones being visible by an operator standing at the station. Initially, the illuminated zones will be spaced apart from one another. The operator moves the carriage linearly towards or away from the beam splitting plate until such time as the illuminated zones are coincident with one another and he then reads off the distance from the scale 20. Movement of the carriage takes place without any change in the inclinations of the beam splitting plate or the mirror so that the beams 14 and 16 retain their angle of inclination to one another. Typically, the beam splitting plate and morror are at an angle of approximately 45° to the beam 10 and the linear path along which the scale 22 extends. The dotted lines in FIG. 1 indicate the situation when the distance to a more distance object O' is to be determined and it will be appreciated that the technique relies on the geometry of similar triangles for its operation.

Unless the distance being determined i.e. the range is very short, the spacing between the mirror and the beam splitting plate will be very much less than the range being determined and it will be appreciated that FIG. 1 is shown at a greatly enlarged scale in the lateral direction. It will also be appreciated that the accuracy of the distance determination will decrease with increasing distance, mainly because of the fact that at greater distances, slight variations in the orientation of the mirror 18 can result in substantial movement of the illuminated zone caused by the beam 16. The technique is, of course, also dependent on the accuracy with which the operator is able to see the illuminated zones and the accuracy with which he can bring them into coincidence by appropriate movement of the carriage. Despite the possible minor inaccuracies which may be obtained, the invention is eminently suitable for use in tunnel profiling, stope measurement and so forth underground in mines where the distances involved will generally be in the range 5 to 30 metres.

FIGS. 2 to 7 illustrate one apparatus of the invention in more detail. Referring to FIGS. 2 and 3, the apparatus is housed in an extruded aluminium casing 30 of rectangular shape and having a longitudinal window 32 on one side thereof. The opposite side of the housing has a longitudinal scale 34 located within a protective plastic cover 36. The casing 30 is mounted on a tribrach 38 which has conventional means enabling it to be mounted on a tripod 40 of known construction.

The tribrach carries a circular bubble of conventional configuration which enables horizontality to be obtained during set-up of the tripod and apparatus. Also a conventional level bubble 41 is provided for ensuring horizontality in the relevant plane of a yoke 42 which supports the casing 30 in pivotal fashion between its spaced, upright arms 44. Angle scales 46 and 48 are provided for measuring the angular orientation of the casing about the vertical axis and about a horizontal axis passing through the points 50 of pivotal connection between the casing and the yoke.

The angle scale 48 is provided with a quick release mechanism enabling the casing 30 to be swung rapidly to a desired orientation about the horizontal axis. Similarly, the angle scale 46 has a rotation lock operated by a wheel 47 (see FIG. 3). When the wheel 47 is loosened off, the casing can be swung rapidly to a particular orientation. Once the casing is approximately at the chosen orientation, the wheel 47 is tightened down and thereafter fine rotational adjustments can be made using a slow rotation screw indicated at 49 in FIG. 3.

On top of the casing 30 there is a sight scope 52 having a centring spot at 53 and a switch 54 having ON, OFF/RECHARGE and EXTERNAL positions. There is a recharging socket 56 by means of which the apparatus can be connected to a source of mains electricity for recharging of the Nicad batteries situated inside the casing when the switch 54 is set to OFF/RECHARGE. When the switch 54 is set to EXTERNAL, the apparatus can be powered by an external 12 V DC power pack connected up to the socket 56.

Inside the casing there is longitudinally oriented laser plasma tube 58 and power supply 59 supplied from the pack 60 of Nicad batteries. The various electrical connections are omitted from FIGS. 4 and 5 in the interests of clarity. The laser tube 58 generates a fine coherent beam 61 of laser light. In the interests of safety, and also to ensure parallelism of the emitted beam 61, the beam is expanded in a conventional expanding lens system indicated generally at 63 with the result that a coherent beam having a diameter of about 8mm emerges from the housing 62. For reasons of clarity, the beam is illustrated in FIG. 4 as being a line of light only.

The beam 61 strikes a first fixed mirror 64 which reflects it onto a second fixed mirror 66 which reflects the beam towards a beam splitting glass plate 68 carried by a holder 70 fixed to the casing 30. The effect of the mirrors 64 and 66 is therefore to reverse the beam 61 and hence to reduce the overall space requirement.

The beam 61 is split by the plate 68 into two beams 72 and 74. The beam 72 is reflected by the plate 68 and leaves the casing through the window 32 after passing through a lens 82 which fans the beam into a short vertically oriented line while the beam 74 passes through the plate and impinges on a mirror 76 mounted on a carriage 78 which is movable along the length of a high precision guide rail 80 fixed to the wall of the casing 30 at either end. The mirror 76 reflects the beam 74 which leaves the casing 30 through the window 32 at an angle to the beam 72. The beam 74 remains as a cylindrical beam and hence illuminates a round spot when it strikes the target.

The beams 72 and 74 correspond to the beams 14 and 16 referred to in connection with FIG. 1.

Provision is made in the mounting of the mirrors 64, 66 and 76 and in the mounting of the beam splitting plate 68 for fine angular adjustments to be made in the factory to ensure that the beams 72 and 74 leave the casing at the correct orientation through the window 32.

Movement of the carriage is achieved by means of a knurled wheel 84 on the outside of the casing 30 and connected to a pulley 86 by means of a short shaft 87 extending through the wall of the casing. A length of strong cord 88 passes about the pulley 86 and about a further pulley 90 at the opposite end of the casing 30.

As indicated in FIG. 6, one end of the cord is tied to one side of the carriage. The lower run 88A of the cord passes right through a hole 85 (FIGS. 5 and 6) which extends from one side to the other of the carriage. The opposite end of the cord enters a hole 87 in the side of the carriage and passes through a compression coil spring 83. The extreme end of the cord carries an abutment which bears up against the coil spring, the coil spring therefore serving to maintain an appropriate tension on the cord.

Clearly, rotation of the wheel 84 results in linear movement of the carriage towards or away from the beam splitting plate 68, such movement being guided by the rail 80. The carriage carries a pointer 92 which moves along the scale 34 as the carriage moves.

It will be appreciated that the rail must be extremely accurately machined if the apparatus is to operate with the desired accuracy. The carriage runs on surfaces 96 and 104 of the rail which are the critical surfaces and which are ground to an extremely accurate tolerance.

The carriage 78 is arranged to move on a series of ball bearing rollers. There are two rollers 94 which run on the critical surface 96, a roller 98 which runs upon the inner surface 100 of the casing 30, two rollers 102 which run on the underside 104 of the guide rail, a roller 106 which runs on the inner, bottom surface 108 of the casing 30 and a roller 110 which runs on the inner surface 112 of the casing.

All of these rollers are visible in FIGS. 4, 5 and 6, the latter figure illustrating the carriage 78 in detail. The roller 98 is carried on a pivotally mounted arm 114 which is biased by a spring 116 (see FIG. 4) towards the surface 100 of the casing. The result is that the rollers 94 are pressed into firm contact with the surface 96 and that the roller 110 is pressed against the surface 112. The rollers 102 are pressed into firm rolling contact with the surface 104 of the rail by the action of the roller 106 which is pressed against the surface 108 of the casing by virtue of the action of a spring 118 which acts between the carriage and an arm 120 carrying the roller 106. The roller 110 gives the assembly stability.

In practice, at least the surface 96 will be ground to a tolerance of less than $0.5 \times 10^{-6}$ m over its full length which will typically be of the order of 300 mm.

Because the accuracy and flatness of the rail 80 is so important, the effects of differential expansion between the casing 30 and the rail must be taken into account in mounting the rail on the wall of the casing, As illustrated in FIG. 7, the rail has cut-outs at each end and presents a slender tail 120 which is connected to the rail by means of a screw 122, a spacer 124, a washer 126, a resilient washer 128, further washers 130 and a nut 132. The resilient nature of the connection takes account of small differential movements between the casing and the rail. Also, the fact that connection takes place through the slender tail means that minor differential movements are taken up in the tail rather than in the body of the rail.

The apparatus described above operates in accordance with the principles set out in the description relating to FIG. 1.

Initially the apparatus is set up over, or as is more usual in mines, under a fixed survey point using a plumb bob. For instance where the apparatus is to be set up in a mine under a fixed point, the plumb bob is suspended from the fixed point and the apparatus is moved until the bob is centralised over the spot 53. Determinations of distance to objects can be made merely by switching the apparatus on and by manipulating the wheel 84 to bring the illuminated zones into coincidence with one another and then reading off the distance on the scale 34. In this regard it should be noted that the provision of a line and a dot of light makes it easier for the operator to judge when a condition of coincidence is achieved. In other embodiments, there may be two vertical lines of light which will also assist in judging when coincidence is achieved.

The operation of the apparatus will be described with reference to a stope measurement where it is desired to plot the profile of a mining face in a horizontal place in a mine stope. Having set up the apparatus on its tripod as described above, and having levelled it, the operator sights through the sight scope 52 onto the next adjacent survey point. He sets the horizontal angle scale to zero with the apparatus at this orientation. Each time the casing 30 is swung about the vertical axis for the taking of distance measurements, the new angular orientation relative to the orientation at which the operator sighted onto the next survey point can be read off the scale. At the angular intervals selected by the operator, distance measurements to the face are made and the profile P can be plotted in the manner shown in FIG. 8 the radial lines in which represent different angular orientations about the vertical axis and the concentric lines in which represent distances in metres from the set-up station.

When the apparatus is used for tunnel profiling, the apparatus is again set up directly under a survey point and the tunnel profile can be plotted by taking distance measurements at different angles relative to a fixed datum such as the vertical, the angles being read off on the scale 48.

It will be immediately apparent that the apparatus is not limited in its use to the profiling of irregular surfaces such as mining faces in stopes or tunnel walls.

It can, of course, be used for one-off distance measurements, in which case the tripod, tribrach, yoke and other ancillary equipment such as the angle scales can be omitted. In this case, the casing along can merely be suspended on a strap about the operator's neck.

In each case the apparatus will be calibrated for a particular range of distances with an appropriate scale 34 being supplied and fixed to the apparatus for the particular range. If the apparatus should, during use, go out of calibration, this can be rectified by adjusting the angular orientation of the beam splitting plate 68 to bring the beams of light into coincidence with one another at a distance which is known by, for instance, measurement with a tape. Similarly, if the apparatus is to be re-calibrated for a new range of distance a new scale is fitted and the angular orientation of the beam splitting plate is adjusted to bring the beams of light into coincidence at a known distance so that the chosen scale 34 gives the correct reading.

Referring again to applications in which vertical profiles, such as tunnel profiles, are to be plotted, it will be noted in FIG. 5 that the scale 34 is a triangular scale with two faces graduated in the appropriate units of distance and that the pointer passes across both faces. This enables the operator to swing the casing 30 to whatever angle he desires about the horizontal axis and still be able to read the scale 34.

Many modifications are possible within the scope of the invention. FIG. 9 illustrates one such modification in an illustration similar to that of FIG. 1. In this figure, components corresponding to those of FIG. 1 are designated with the same reference numerals with the addition of the prefix "2".

The main difference between the arrangements of FIGS. 1 and 9 is the fact that it is not the mirror 218 which is movable, but the beam splitting plate 212. In this case, the beam splitting plate 212 is mounted on a movable carriage while the mirror 218 is fixed in position, and it is the beam splitting plate which is moved towards or away from the mirror to bring the illuminated zones on the target object into coincidence with one another.

FIG. 10 illustrates yet another possibility which will have application in the measurement of longer distances than the apparatuses described so far. In this case, the two beams 300 and 302 of laser light are generated by different laser tubes. Of course, the apparatus will have to be housed in a substantially longer casing than the previous examples.

In FIG. 10, the beam 300 generated by the laser tube 304 is reflected from a fixed mirror 305. The beam 302 generated by the laser tube 306 is reversed by the fixed mirrors 308 and 310 and is then reflected from a mirror 312 mounted on a movable carriage. With this arrangement it is possible to have the mirrors 305 and 312 spaced further apart than the beam splitting plate and mirror of previous embodiments and hence to get greater accuracy in readings over longer distances.

In another modification of the apparatus of the invention, the movable carriage can be provided with slides as opposed to rollers to enable it to move smoothly along its guide rail.

In place of the pointer 92 and linear scale 34 to indicate the distance being measured, the distance may be indicated by means of an electronic digital display.

An example of such a device comprises a rotary resistor having a very precise linear response and a range of, say ten turns, the rotatable shaft of such resistor being attached co-axially to the shaft 87 carrying the pulley 86 and being manually adjustable by means of the knob 84.

The resistor is electrically connected into an electronic circuit having a digital display, the read-out of such display being in direct relationship to the relative position of the carriage 78, and thus, suitably calibrated, indicates the distance being measured. Similarly, the operation of the horizontal and vertical angle scales is mechanical in the described embodiments, while other embodiments may employ electronic means to produce digital values for the horizontal and vertical angles.

I claim:

1. A method of determining the distance of an object from a station, the method including the following steps:
   (a) projecting relatively inclined beams of visible laser light from spaced locations at the station towards the object so as to illuminate a first and a second zone on the object;
   (b) fanning one of the beams of visible laser light such that the first zone appears as an illuminated spot while the second zone appears as an illuminated line;
   (c) while maintaining the relative inclination between the beams of light, moving the locations relative to one another along a linear path so as to bring the first and second illuminated zones into coincidence with one another; and
   (d) deriving the distance of the object from the station from the spacing along the linear path between the locations when the first and second zones are coincident with one another.

2. The method of claim 1 and including the step of reading off the distance of the object from the station on a calibrated linear scale extending along the linear path.

3. The method of claim 2 and including the step of using a single laser source to generate both laser beams.

4. The method of claim 3 and including the step of splitting a single beam of laser light generated by the single source into two beams.

5. The method of claim 4 and including projecting the single beam of visible laser light along a line parallel to the linear path and onto a beam splitting plate oriented at an angle to the linear path and situated at one of the locations, the beam splitting plate then reflecting a first beam of light towards the object, and reflecting light which passes through the beam splitting plate from a mirror oriented at an angle to the linear path and situated at the other location.

6. The method of claim 5 and including moving the mirror along the linear path towards or away from the beam splitting plate to bring the illuminated zones into coincidence with one another.

7. The method of claim 5 and including moving the beam splitting plate along the linear path towards or away from the mirror to bring the illuminated zones into coincidence with one another.

8. The method of claim 2 and including the step of using two laser sources, one to generate each beam.

9. An apparatus for determining the distance of an object from a station, the apparatus including:
   (a) means at the station for projecting relatively inclined beams of visible laser light from spaced locations at the station towards the object so as to illuminate a first and a second zone on object;
   (b) means at the station for moving the locations relative to one another along a linear path so as to bring the first and second zones into coincidence with one another;
   (c) means enabling the distance of the object from the station to be derived from the spacing of the locations along the linear path when the zones are coincidence; and
   (d) means at the station for fanning out one of the beams of laser light such that the first zone appears as an illuminated spot while the second zone appears as an illuminated line.

10. The apparatus of claim 9 in which the means enabling the distance of the object from the station to be derived is a calibrated scale extending along the linear path.

11. The apparatus of claim 10 further comprising a single laser tube and means for splitting the single beam of laser light generated by the laser tube into two beams inclined relative to one another.

12. The apparatus of claim 11 in which the laser tube is arranged to project a single beam of laser light along a line parallel to the linear path and including a beam splitting plate at one of the locations for splitting the single beam into two beams one of which is reflected by the beam splitting plate and the other of which passes through the beam splitting plate and is reflected by a mirror at the other location.

13. The apparatus of claim 12 in which the mirror is mounted on a movable carriage for movement along the linear path towards or away from the beam splitting plate.

14. The apparatus of claim 13 in which the carriage includes rollers arranged to roll along a guide rail oriented parallel to the linear path.

15. The apparatus of claim 12 in which the beam splitting plate is mounted on a movable carriage for movement along the linear path towards or away from the mirror.

16. The apparatus of claim 9 and including two laser tubes, one for generating each beam.

17. The apparatus of claim 9 and including a housing from which the relatively inclined beams are projected, means for mounting the housing on a tripod for movement about vertical and horizontal axes and angle scales for indicating the angular orientation of the housing about those axes.

18. An apparatus for determining the distance of an object from a station, the apparatus including:
   (a) means for projecting relatively inclined beams of visible laser light from spaced locations at the station towards the object so as to illuminate a first and a second zone on the object;
   (b) means at the station for fanning one of the beams of laser light such that the first zone appears as an illuminated spot while the second zone appears as an illuminated line;

(c) means at the station for moving the locations relative to one another along a linear path so as to bring the dot and line into coincidence with one another; and
(d) means enabling the distance of the object from the station to be derived from the spacing of the locations along the linear path when the dot and line are coincident.

* * * * *